A. ROESGEN.
DIRIGIBLE HEADLIGHT.
APPLICATION FILED OCT. 5, 1911.

1,036,341.

Patented Aug. 20, 1912.

3 SHEETS—SHEET 1.

Witnesses:
Chas. J. Clagett
A. L. Serrell

Inventor,
Albert Roesgen
By Harold Serrell
his Attorney.

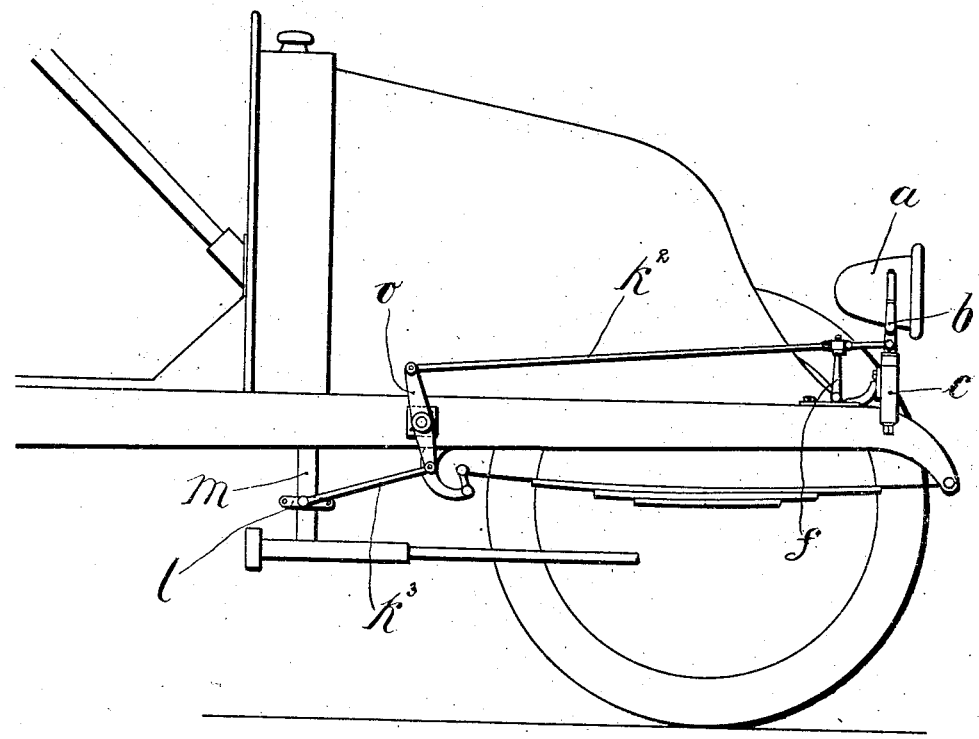

A. ROESGEN.
DIRIGIBLE HEADLIGHT.
APPLICATION FILED OCT. 5, 1911.
1,036,341.
Patented Aug. 20, 1912.
3 SHEETS—SHEET 3.
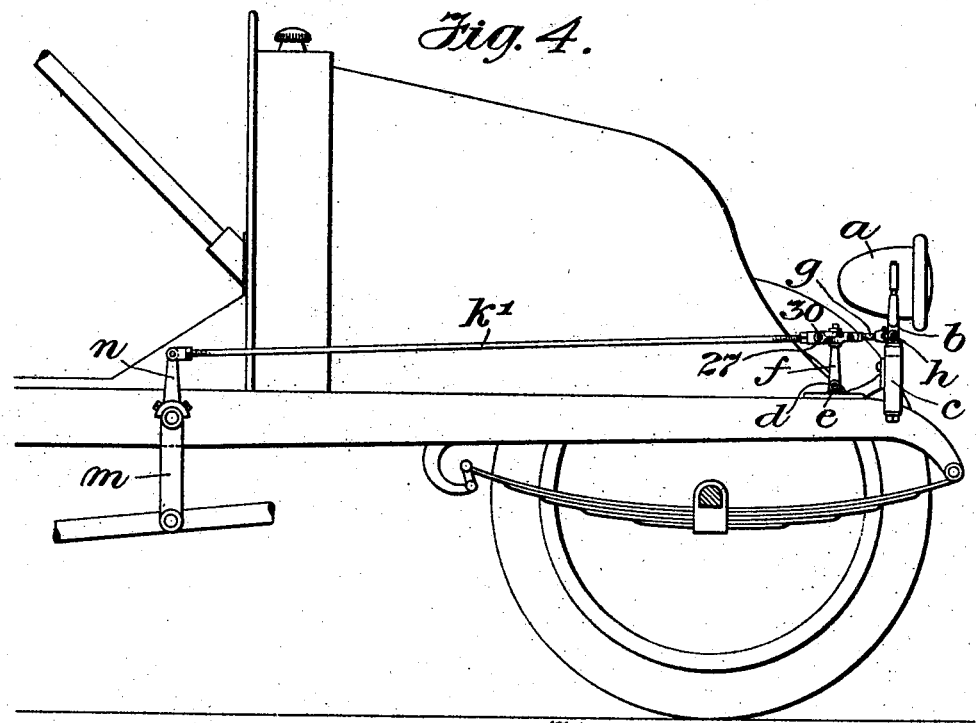
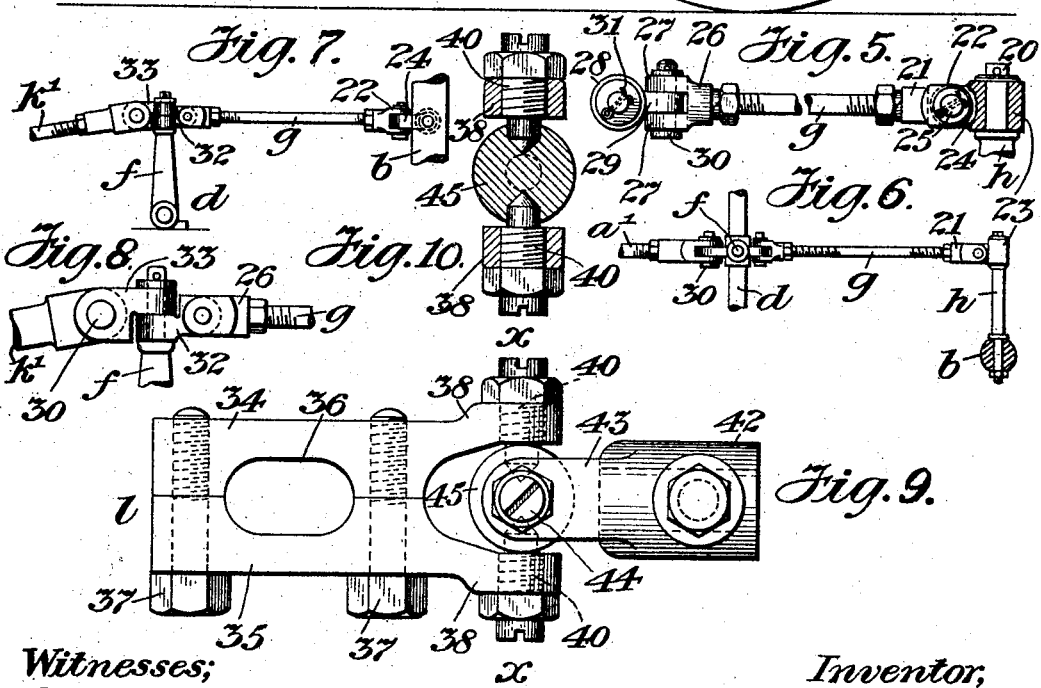
Witnesses:
Chas. F. Clagett
Inventor,
Albert Roesgen
By Harold Serrell
his Attorney.

UNITED STATES PATENT OFFICE.

ALBERT ROESGEN, OF GENEVA, SWITZERLAND.

DIRIGIBLE HEADLIGHT.

1,036,341.  Specification of Letters Patent.  Patented Aug. 20, 1912.

Application filed October 5, 1911. Serial No. 652,910.

*To all whom it may concern:*

Be it known that I, ALBERT ROESGEN, manufacturer, a citizen of Switzerland, residing at Rue Versonnex 15, Geneva, in the Confederation of Switzerland, have invented certain new and useful Improvements in Dirigible Headlights, of which the following is a specification.

Various devices have been devised to turn the headlights or lamps of motor cars, so that the light from the same will always be directed in a line parallel to the direction in which the car is moving and it is to this class of devices to which my invention relates, the object thereof being the provision of an apparatus of comparatively inexpensive construction which may be easily applied to any make of motor car, and when so applied will be positive and certain in action.

According to my invention, both lamps are carried by revoluble supports mounted in bearings secured to the frame members or side members of the frame of the car, and said revoluble supports are connected by rods with universal joints or other suitable means to extremities of two arms secured to a common transverse shaft mounted in bearings carried by the said frame members of the car in front of the radiator or engine bonnet of the vehicle.

The lamp supports are operated by means of a rod with universal joints connected at one end with the steering lever and at the other end with an arm causing the revoluble supports to rotate whenever the arm is caused to swing. This arm may be placed on one of the revoluble supports, or may be one of the arms carried by the transverse shaft, as will hereinafter be more particularly described.

Figure 1:
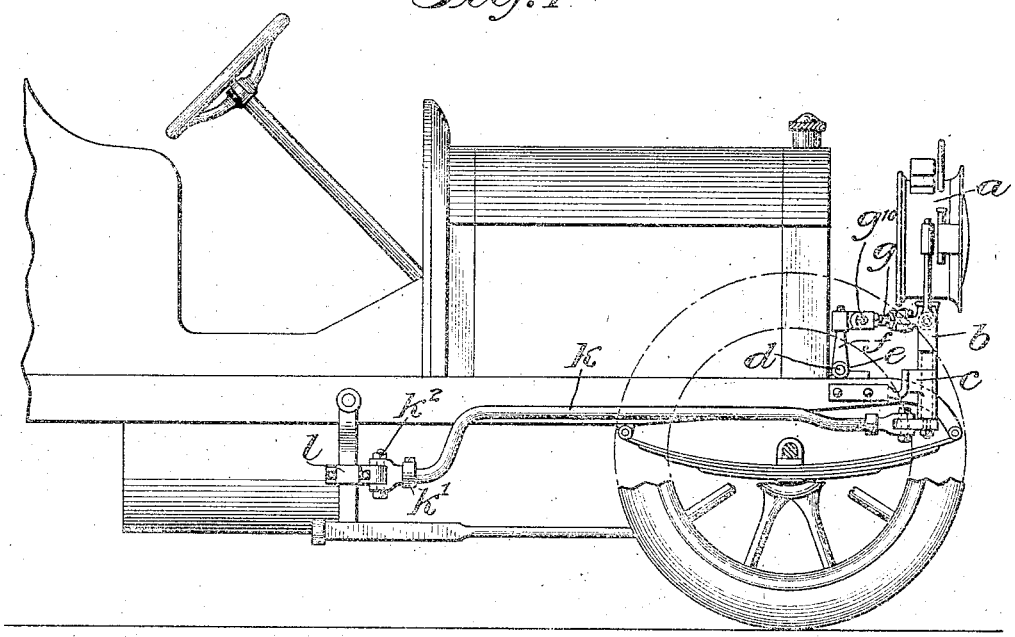
Figure 2:
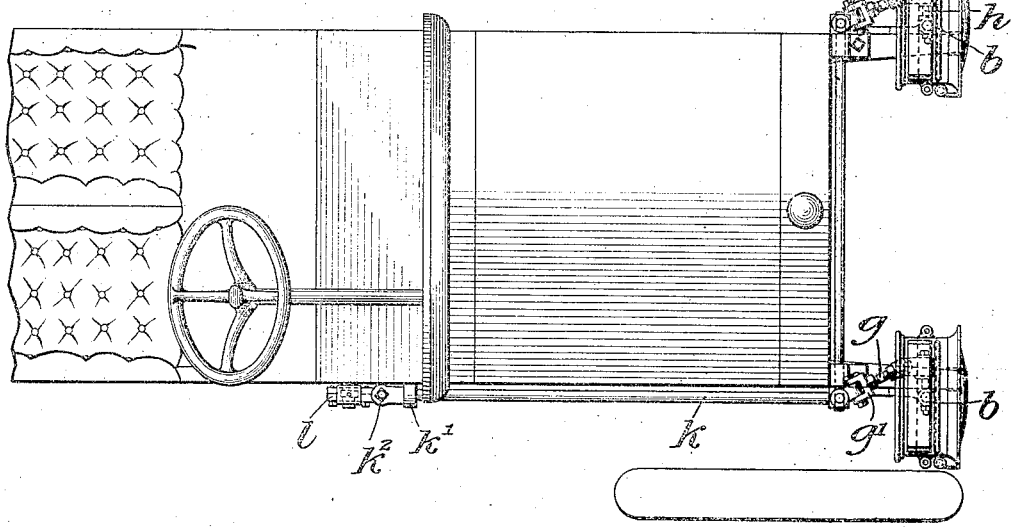

In the drawings, Figure 1 is a side elevation showing one form of the invention. Fig. 2 is a plan view of the same. Fig. 3 shows a modification of the same. Fig. 4 is an elevation showing a further modification of my invention. Fig. 5 is a plan on an enlarged scale of the rod and joints connecting the lamp posts and the arms from which the same are operated, as shown in Figs. 1 and 2. Fig. 6 is a plan and partial section of the rods and parts connecting the lamp posts and means for operating the same as shown in Figs. 3 and 4. Fig. 7 is an elevation of the parts shown in Fig. 6. Fig. 8 is an enlarged elevation illustrating more clearly the connection between the rods and the arm secured to the transverse shaft. Fig. 9 is a plan of the universal joint by which connection is made between the steering lever and the rod connecting the same to the parts for turning the lamps, and Fig. 10 is a section on line $x, x,$ Fig. 9.

$a, a,$ designate the two lamps which are carried by the fork shaped lamp posts $b$, the vertical parts of which are revolubly mounted in the bearings $c$, which preferably are ball-bearings of any well-known type. The bearings $c$ are fixed on the frame members of the motor car.

$d$ is a transverse shaft mounted in bearings $e$ fixed on the frame members of the vehicle. Adjacent to the ends of the transverse shaft $d$ are mounted arms $f$ connected by means of universal joints to one end of short rods $g$. The rods $g$ are connected at their opposite ends, by means of universal joints, with the ends of short arms $h$, carried by the vertical parts of the lamp posts $b$. These arms are placed, as shown in Fig. 2, on the corresponding sides of the lamp posts, both lamps being thus turned simultaneously whenever the transverse shaft $d$ is actuated and the arms $f$ are swung backward or forward.

As shown in Figs. 1 and 2, on the lower end of the vertical part of one of the lamp posts is secured a small arm $i$ with which is connected by means of a universal joint, one end of a rod $k$, the other end of which is connected by means of a universal joint with a collar $l$, formed with two branches which may be drawn together by means of a screw so as to fix the collar in position on the steering lever $m$ of the motor car. Thus, whenever the steering wheel of the vehicle is actuated, the steering lever $m$ is moved and swings forward or backward, and the movement of the steering lever $m$ is transmitted through the rod $k$ to the arm $i$, thereby turning in one direction or the other the lamp post to which the arm $i$ is secured. This turning movement of the lamp post $b$ is transmitted through its arm $h$, the rod $g$ connected therewith, the arm $f$ to which this rod is connected and to the transverse shaft $d$, which is thereby rocked in one direction or the other. This rocking movement of the transverse shaft $d$ is transmitted to the arm $f$ and from this arm $f$ to its rod $g$ and therefrom through its short arm $h$ to the other lamp post $b$, so that both the lamps are simultaneously turned in corresponding directions.

In order that the light projected by the lamps be directed in the same direction as the vehicle is running, the position of the collar $l$ is adjusted so that the angular displacement of the lamps corresponds exactly to the angular displacement of the wheels of the vehicle.

The desired result is thus obtained by means of a device of a very simple construction, easy to be adopted on every motor car and which works without interfering in any manner with the operation of the motor car, as the effort necessary to turn the lamps is practically so slight that no additional resistance at all is felt on the steering wheel, which is an essential condition to not interfere with the safety of traveling with the vehicle.

In some instances, it may be desirable to place the connecting rod above the frame member of the car instead of beneath the same. This may be done as illustrated in Fig. 4, by extending the steering lever $m$ in an arm indicated at $n$ and connecting the arm $n$ by a suitable link $k'$ with one of the arms $f$ secured to the transverse shaft $d$; or as shown in Fig. 3, I may employ a lever $o$ suitably connected to the frame of the car, and connect one end of the lever $o$ by a rod $k^2$ with one of the arms $f$ secured on the transverse arm $d$, while the other end of the lever $o$ is connected to the steering lever $m$ by the same collar $l$ as hereinbefore described and the rod $k^3$.

In order that the construction of the parts connecting the rotatable lamp posts with the steering lever of the car may be readily understood, reference is made to Figs. 5 to 10 inclusive. By reference to Fig. 5, the construction of these parts as employed in the form of the invention as shown in Fig. 1, is illustrated. The arm $h$ is securely connected to one of the lamp posts $b$ in any desired manner. The free end of the arm $h$ terminates in a reduced portion 20. The rod $g$ at one end is provided with a head 21, terminating in lugs 22. Fitting over and journaled on the reduced portion 20 of the arm $h$ is a head 23, and on the head 23 there is a lug 24 adapted to pass within and fit the recess between the lugs 22 on the head 21. Through suitable holes in the said lugs 22 and 24, a pin 25 is passed to pivotally connect the same.

On the opposite end of the rod $g$, a head 26 is secured. This head, similarly to the head 21, is provided with spaced lugs 27, and the head 21 and the head 26 are so secured to the rod $g$ that when the lugs 22 on the head 21 are in a horizontal position which they assume when in use, the lugs 27 on the head 26 are in vertical position.

Journaled on the free end of the arm $f$ is a collar 28, on which collar is a lug 29 adapted to pass within the recess formed by the lugs 27 in the head 26, and the lugs 27 and 29 are secured together by a pin 30 which passes through holes provided in these lugs for this purpose, and the collar 28 is secured in position on the end of the arm $f$ by a cotter-pin 31 or otherwise.

Now referring to Figs. 6, 7 and 8, it will be apparent that the construction of the joints between the collar 28 and the rotatable lamp posts in the same is the same as that hereinbefore described in connection with Fig. 5. In this construction shown in Figs. 6, 7 and 8, which is that employed in the modified forms of the invention shown in Figs. 3 and 4, the part corresponding to the collar 28 is preferably made in halves, as clearly indicated in Fig. 8. One of these halves 32 is connected to the head 26 in exactly the same manner as is the collar 28, as shown in Fig. 5, and the other member 33 is similarly journaled on the end of the arm $f$ and is connected to the end of the rod $k'$, as shown in Fig. 4, or the rod $k^2$ as shown in Fig. 3.

Referring to Figs. 9 and 10, the collar $l$ is preferably made in two parts, 34 and 35, provided with a recess 36 to receive the steering lever $m$, and secured together by the bolts 37 or otherwise. The members 34, 35, of this collar are provided with spaced apart arms 38 adapted to receive the screws 40.

On the adjacent end of the lever $k$ there is a head 42 and this head is provided with arms 43, similar in all respects to the arms 38, and each provided with a screw 44 similar to the screws 40.

45 designates a ball, in a line on whose circumference in equally spaced positions, recesses are provided to receive the ends of the screws 40, 44, by which construction, manifestly, a universal joint is made between the collar $l$ and the rod $k$.

I claim as my invention:

1. A device for turning the head-lights of motor cars, comprising rotatable posts for the lamps, bearings for the same fixed on the frame members of the vehicle, a transverse shaft mounted in bearings fixed on the frame members of the vehicle, two arms carried by the transverse shaft, rods, universal joints between the corresponding ends of the said rods and the said arms, universal joints connecting the other ends of the said rods and the said posts, and a connecting rod for operating the rotatable posts, one end of which is connected with the steering lever of the vehicle.

2. A device for steering the head-lights of motor cars comprising two rotatable posts for the lamps, a transverse shaft, arms secured on said transverse shaft, rods, universal joints connecting the corresponding ends of the said rods with the said arms, universal joints between the other ends of the said rods and the said posts, and a rod for operating the aforesaid members from the steering lever of the vehicle.

3. An apparatus for turning the head-lights of motor cars, comprising rotatable posts upon which the head light lamps are secured, an arm connected to each rotatable post, a transverse shaft, lever arms connected to the transverse shaft, rods, universal joints connecting the corresponding ends of the said rods with the said lever arms secured to the transverse shaft, universal joints connecting the other ends of the said rods with the arms secured to the said rotatable posts, and means for operating the said parts from the steering lever of the car to turn the lights as the steering wheels are turned.

4. An apparatus for turning the head-lights of motor cars, comprising rotatable posts upon which the head light lamps are secured, an arm connected to each rotatable post, a transverse shaft, lever arms connected to the transverse shaft, rods, universal joints connecting the corresponding ends of the said rods with the said lever arms secured to the transverse shaft, universal joints connecting the other ends of the said rods with the arms secured to the said rotatable posts, an arm secured to the lower end of one of said rotatable posts, and means connecting the last aforesaid arm to the steering gear of the car to turn the head-lights as the steering wheels are turned.

5. An apparatus for turning the head-lights of motor cars, comprising rotatable posts upon which the head light lamps are secured, an arm connected to each rotatable post, a transverse shaft, lever arms connected to the transverse shaft, rods, universal joints connecting the corresponding ends of the said rods with the said lever arms secured to the transverse shaft, universal joints connecting the other ends of the said rods with the arms secured to the said rotatable posts, an arm secured to the lower end of one of the said rotatable posts, a rod pivotally connected at one end to the last aforesaid arm, and a universal joint connecting the opposite end of the last aforesaid rod to the steering lever of the car.

In testimony whereof I have affixed my signature in presence of two witnesses.

ALBERT ROESGEN.

Witnesses:
 ROD. DE WENS HANBERG,
 L. H. MUNIER.